(12) United States Patent
Rose

(10) Patent No.: US 11,947,199 B1
(45) Date of Patent: Apr. 2, 2024

(54) METHOD AND APPARATUS FOR VISUAL FIELD TRANSLATION TO COMPENSATE FOR CENTRAL FIELD SCOTOMAS

(71) Applicant: Whaid Rose, Denver, NC (US)

(72) Inventor: Whaid Rose, Denver, NC (US)

( * ) Notice: Subject to any disclaimer, the term of this patent is extended or adjusted under 35 U.S.C. 154(b) by 305 days.

(21) Appl. No.: 17/222,871

(22) Filed: Apr. 5, 2021

Related U.S. Application Data

(60) Provisional application No. 63/004,612, filed on Apr. 3, 2020.

(51) Int. Cl.
*G02C 7/14* (2006.01)

(52) U.S. Cl.
CPC ........... *G02C 7/14* (2013.01); *G02C 2202/06* (2013.01); *G02C 2202/10* (2013.01)

(58) Field of Classification Search
CPC .. G02C 7/14; G02C 2202/06; G02C 2202/10; G02C 7/088; G02C 7/086; G02C 9/00; G02C 7/043; G02B 2027/0178; G02B 27/017; G02B 23/02; A61B 3/04
See application file for complete search history.

(56) References Cited

U.S. PATENT DOCUMENTS

| | | | | |
|---|---|---|---|---|
| 4,155,633 A * | 5/1979 | Benavie | ................... | G02C 7/14 351/158 |
| 5,155,508 A * | 10/1992 | Onufryk | .............. | G02C 13/003 351/158 |
| 6,155,682 A * | 12/2000 | Steinberg | ................. | G02C 7/14 623/6.35 |
| 6,299,304 B1 * | 10/2001 | Demuth | .................... | G02C 7/14 351/158 |
| 2005/0225714 A1 * | 10/2005 | Thir | ......................... | G02C 9/02 351/59 |
| 2010/0302503 A1 * | 12/2010 | Oestereich | ............. | G02C 7/088 351/158 |
| 2018/0173016 A1 * | 6/2018 | Lin | ......................... | G02C 7/14 |
| 2020/0085295 A1 * | 3/2020 | Miyauchi | ............. | A61B 3/1025 |

* cited by examiner

*Primary Examiner* — Darryl J Collins
*Assistant Examiner* — Matthew Y Lee
(74) *Attorney, Agent, or Firm* — Taboada Law Firm, PLLC; John M. Taboada

(57) ABSTRACT

Methods and apparatuses for visual field translation are disclosed, including providing an apparatus comprising: a platform; first and second left eye mirrors and first and second right eye mirrors coupled to the platform, wherein the left eye and right eye mirrors are configured to redirect light reflecting or emanating from an object onto regions of the user's retinas unaffected by scotomas; wherein the first left eye mirror and the first right eye mirror are positioned to approximately match a pupillary distance between the user's eyes; and viewing into the apparatus and making adjustments to one or more of the first left eye mirror, the second left eye mirror, the first right eye mirror, and the second right eye mirror in order to translate the user's central vision axis onto regions of the user's retinas unaffected by scotomas. Other embodiments are described and claimed.

16 Claims, 3 Drawing Sheets

Provide an apparatus for visual field translation to compensate for central field scotomas comprising a platform having four 2-axis mirrors configured to direct light reflecting or emanating from an object and onto an area of the retina unaffected by the scotomas instead of onto what would be the uncorrected central vision axis of a user.
405

User views into the apparatus and then makes pan and tilt adjustments to the four 2-axis mirrors in order to translate the user's central vision axis onto an area of the unaffected part of the retina.
410

*Fig. 4*

METHOD AND APPARATUS FOR VISUAL FIELD TRANSLATION TO COMPENSATE FOR CENTRAL FIELD SCOTOMAS

I. CROSS REFERENCE TO RELATED APPLICATIONS

This application claims the benefit of the filing date of U.S. Provisional Patent Application Ser. No. 63/004,612, filed on Apr. 3, 2020, entitled "Method and Apparatus for Visual Field Translation to Compensate for Central Field Scotomas," the entire disclosure of which is hereby incorporated by reference into the present disclosure.

II. BACKGROUND

The present invention pertains to a vision assistance tool. More particularly, the invention relates to a method and apparatus for visual field translation to compensate for central field scotomas.

III. SUMMARY

In one respect, disclosed is an apparatus for visual field translation comprising: a platform; a first left eye mirror coupled to the platform; a second left eye mirror coupled to the platform, wherein the first left eye mirror and the second left eye mirror are configured to redirect light reflecting or emanating from an object and intended for a user's left eye central vision axis and instead onto a region of the user's left eye retina unaffected by scotomas; a first right eye mirror coupled to the platform; and a second right eye mirror coupled to the platform, wherein the first right eye mirror and the second right eye mirror are configured to redirect the light reflecting or emanating from the object and intended for the user's right eye central vision axis and instead onto a region of the user's right eye retina unaffected by scotomas; wherein the first left eye mirror and the first right eye mirror are positioned to match a pupillary distance between the user's left eye and right eye.

In another embodiment, disclosed is a method for visual field translation to compensate for central field scotomas, comprising: providing an apparatus comprising: a platform; a first left eye mirror coupled to the platform; a second left eye mirror coupled to the platform, wherein the first left eye mirror and the second left eye mirror are configured to redirect light reflecting or emanating from an object and intended for a user's left eye central vision axis and instead onto a region of the user's left eye retina unaffected by scotomas; a first right eye mirror coupled to the platform; and a second right eye mirror coupled to the platform, wherein the first right eye mirror and the second right eye mirror are configured to redirect the light reflecting or emanating from the object and intended for the user's right eye central vision axis and instead onto a region of the user's right eye retina unaffected by scotomas; wherein the first left eye mirror and the first right eye mirror are positioned to approximately match a pupillary distance between the user's left eye and right eye; and viewing into the apparatus and making adjustments to one or more of the first left eye mirror, the second left eye mirror, the first right eye mirror, and the second right eye mirror in order to translate the user's central vision axis onto regions of the user's retinas unaffected by scotomas.

Numerous additional embodiments are also possible.

IV. BRIEF DESCRIPTION OF THE DRAWINGS

Other objects and advantages of the invention may become apparent upon reading the detailed description and upon reference to the accompanying drawings.

FIG. 4 is a flowchart illustrating a method for visual field translation using the apparatus illustrated in FIG. 1, FIG. 2, and FIG. 3, in accordance with some embodiments.

Figure 1:
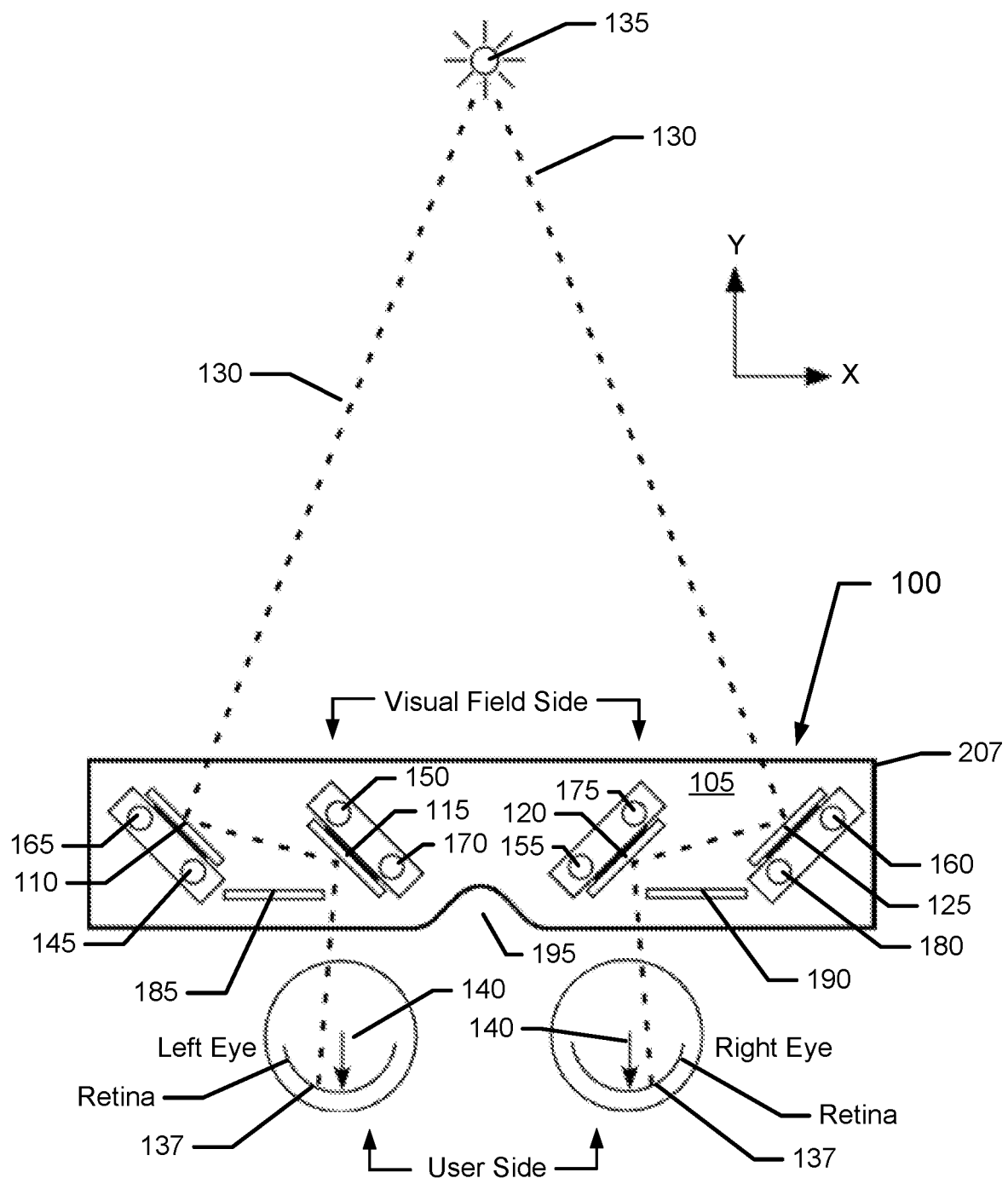
FIG. 1 is a top view schematic of an apparatus for visual field translation, in accordance with some embodiments.

While the invention is subject to various modifications and alternative forms, specific embodiments thereof are shown by way of example in the drawings and the accompanying detailed description. It should be understood, however, that the drawings and detailed description are not intended to limit the invention to the particular embodiments. This disclosure is instead intended to cover all modifications, equivalents, and alternatives falling within the scope of the present invention as defined by the appended claims.

V. DETAILED DESCRIPTION

One or more embodiments of the invention are described below. It should be noted that these and any other embodiments are exemplary and are intended to be illustrative of the invention rather than limiting. While the invention is widely applicable to different types of systems, it is impossible to include all of the possible embodiments and contexts of the invention in this disclosure. Upon reading this disclosure, many alternative embodiments of the present invention will be apparent to persons of ordinary skill in the art.

The presence of a central scotoma in a person's eye fundus creates a blind spot in which the individual has to adjust the direction of their gaze in order to place the object of interest in a region of the retina unaffected by the central scotoma. Thus for example, if the individual suffering from a central scotoma is having a face to face conversation with another individual, it would appear to that other individual that the individual suffering from the central scotoma was not looking in their direction. In reality though, the individual suffering from the central scotoma is merely trying to see the other individual by shifting their fixation point to a healthy portion of the retina.

A need exists for a method and apparatus for visual field translation to compensate for central field scotomas. The embodiment or embodiments described herein solve these problems and others by proposing a new method and apparatus to translate a user's fixation point to an area of the retina unaffected by the scotoma.

FIG. 1 is a top view schematic of an apparatus for visual field translation, in accordance with some embodiments.

Figure 2:
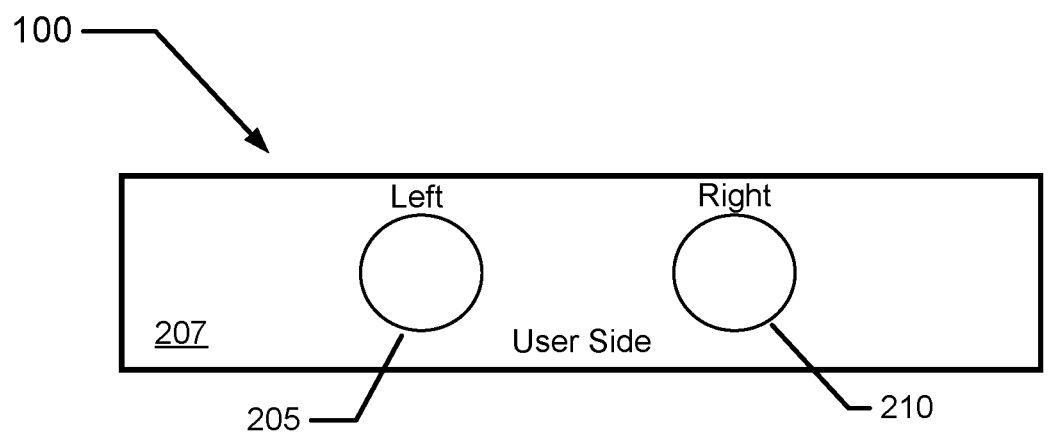
FIG. 2 is a side view from the user side of the apparatus for visual field translation, in accordance with some embodiments.

FIG. 2 is a side view from the user side of the apparatus for visual field translation, in accordance with some embodiments.

Figure 3:
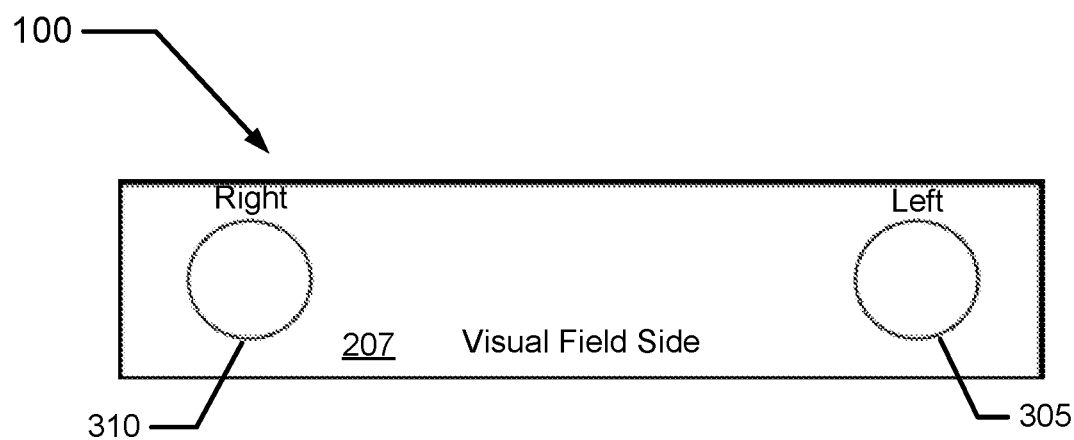
FIG. 3 is a side view from the visual field side of the apparatus for visual field translation, in accordance with some embodiments.

FIG. 3 is a side view from the visual field side of the apparatus for visual field translation, in accordance with some embodiments.

In some embodiments, the apparatus 100 for visual field translation comprises a platform 105 having four 2-axis mirrors 110, 115, 120, 125 configured to direct light 130 reflecting or emanating from an object 135 and onto an area of the retina unaffected by the scotomas 137 instead of onto what would be the uncorrected central vision axis 140 of a user. A vertical surface 207 extends from the platform and encloses the four 2-axis mirrors. In some embodiments, a cover plate is coupled to the vertical surface. Each mirror 110, 115, 120, 125 comprises both a pan adjustment 145, 150, 155, 160, respectively, and a tilt adjustment 165, 170, 175, 180, respectively. In some embodiments, a left eye baffle 185 and a right eye baffle 190 are secured to the platform to block stray light from interfering with the user's left and right eyes, respectively. In some embodiments, the platform comprises a recess 195 to accommodate the bridge of the user's nose. The separation between mirrors 115 and 120 are adjusted to match the pupillary distance between the user's left and right eyes. The user views into the user side of the apparatus with their left eye through the left eye port 205, through the mirrors 110, 115, and out of the visual field side of the apparatus through the left visual field side port 305. The user views into the user side of the apparatus with their right eye through the right eye port 210, through the mirrors 120, 125, and out of the visual field side of the apparatus through the right visual field side port 310. The 2-axis mirrors 110, 115, 120, 125 are adjusted to precisely adjust the central vision axis onto an unaffected area of the retina. Since the mirrors 110 and 125 are outside of the mirrors 115 and 120 and thus the separation between the left visual field side port 305 and the right visual field side port 310 is greater than the separation between the left eye port 205 and the right eye port 210, the user will have an increased depth perception. In an alternate embodiment with decreased depth perception, the mirrors 110 and 125 are inside of the mirrors 115 and 120 and thus the separation between the left visual field side port 305 and the right visual field side port 310 is less than the separation between the left eye port 205 and the right eye port 210. The pan and tilt adjustments of each of the mirrors may be independently adjusted to adjust the image of the object onto a healthy, unaffected portion of the retina of each eye.

FIG. 4 is a flowchart illustrating a method for visual field translation using the apparatus illustrated in FIG. 1, FIG. 2, and FIG. 3, in accordance with some embodiments.

According to one embodiment of the present invention, the method for visual field translation to compensate for central field scotomas begins at block 405, where an apparatus for visual field translation to compensate for central field scotomas is provided, wherein the apparatus for visual field translation to compensate for central field scotomas comprises a platform having four 2-axis mirrors configured to direct light reflecting or emanating from an object and onto an area of the retina unaffected by the scotomas instead of onto what would be the uncorrected central vision axis of a user. In some embodiments, the apparatus further comprises a left eye baffle and a right eye baffle secured to the platform to block stray light from interfering with the user's left and right eyes, respectively. Next, at block 410, the user views into the apparatus and then makes pan and tilt adjustments to the four 2-axis mirrors in order to translate the user's central vision axis onto an area of the unaffected part of the retina.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

The benefits and advantages that may be provided by the present invention have been described above with regard to specific embodiments. These benefits and advantages, and any elements or limitations that may cause them to occur or to become more pronounced are not to be construed as critical, required, or essential features of any or all of the claims. As used herein, the terms "comprises," "comprising," or any other variations thereof, are intended to be interpreted as non-exclusively including the elements or limitations which follow those terms. Accordingly, a system, method, or other embodiment that comprises a set of elements is not limited to only those elements, and may include other elements not expressly listed or inherent to the claimed embodiment.

While the present invention has been described with reference to particular embodiments, it should be understood that the embodiments are illustrative and that the scope of the invention is not limited to these embodiments. Many variations, modifications, additions and improvements to the embodiments described above are possible. It is contemplated that these variations, modifications, additions and improvements fall within the scope of the invention as detailed within the following claims.

The invention claimed is:

1. An apparatus for visual field translation comprising:
   a platform;
   a first left eye mirror coupled to the platform;
   a second left eye mirror coupled to the platform, wherein the first left eye mirror and the second left eye mirror are configured to redirect light reflecting or emanating from an object and intended for a user's left eye central vision axis and instead onto a region of the user's left eye retina unaffected by scotomas;
   a first right eye mirror coupled to the platform; and
   a second right eye mirror coupled to the platform, wherein the first right eye mirror and the second right eye mirror are configured to redirect the light reflecting or emanating from the object and intended for the user's right eye central vision axis and instead onto a region of the user's right eye retina unaffected by scotomas;
   wherein the first left eye mirror is centered with the user's left eye central vision axis,
   wherein the first right eye mirror is centered with the user's right eye central vision axis, and
   wherein the first left eye mirror and the first right eye mirror are positioned to match a pupillary distance between the user's left eye and right eye.

2. The apparatus of claim 1, further comprising a vertical surface extending from the platform and configured to enclose the first left eye mirror, the second left eye mirror, the first right eye mirror, and the second right eye mirror, the vertical surface comprising:
   a left eye port configured to allow the user to gaze onto the first left eye mirror;
   a right eye port configured to allow the user to gaze onto the first right eye mirror;
   a left visual side port configured to pass the light reflecting or emanating from the object and onto the second left eye mirror; and
   a right visual side port configured to pass the light reflecting or emanating from the object and onto the second right eye mirror.

3. The apparatus of claim 2, further comprising a cover plate coupled to the vertical surface.

4. The apparatus of claim 1, further comprising:
a left eye baffle coupled to the platform, the left eye baffle configured to block stray light from interfering with the user's left eye; and
a right eye baffle coupled to the platform, the right eye baffle configured to block stray light from interfering with the user's right eye.

5. The apparatus of claim 1, wherein the platform comprises a recess configured to accommodate a bridge of the user's nose.

6. The apparatus of claim 1, wherein the first left eye mirror comprises a 2-axis mirror, wherein the second left eye mirror comprises a 2-axis mirror, wherein the first right eye mirror comprises a 2-axis mirror, and wherein the second right eye mirror comprises a 2-axis mirror.

7. The apparatus of claim 1, wherein separation between the second left eye mirror and the second right eye mirror is less than the pupillary distance.

8. The apparatus of claim 1, wherein separation between the second left eye mirror and the second right eye mirror is greater than the pupillary distance.

9. A method for visual field translation to compensate for central field scotomas, comprising:
providing an apparatus comprising:
i) a platform;
ii) a first left eye mirror coupled to the platform;
iii) a second left eye mirror coupled to the platform, wherein the first left eye mirror and the second left eye mirror are configured to redirect light reflecting or emanating from an object and intended for a user's left eye central vision axis and instead onto a region of the user's left eye retina unaffected by scotomas;
iv) a first right eye mirror coupled to the platform; and
v) a second right eye mirror coupled to the platform, wherein the first right eye mirror and the second right eye mirror are configured to redirect the light reflecting or emanating from the object and intended for the user's right eye central vision axis and instead onto a region of the user's right eye retina unaffected by scotomas;
vi) wherein the first left eye mirror is centered with the user's left eye central vision axis,
vii) wherein the first right eye mirror is centered with the user's right eye central vision axis, and
vii) wherein the first left eye mirror and the first right eye mirror are positioned to approximately match a pupillary distance between the user's left eye and right eye; and
viewing into the apparatus and making adjustments to one or more of the first left eye mirror, the second left eye mirror, the first right eye mirror, and the second right eye mirror in order to translate the user's central vision axis onto regions of the user's retinas unaffected by scotomas.

10. The method of claim 9, wherein the apparatus further comprises a vertical surface extending from the platform and configured to enclose the first left eye mirror, the second left eye mirror, the first right eye mirror, and the second right eye mirror, the vertical surface comprising:
a left eye port configured to allow the user to gaze onto the first left eye mirror;
a right eye port configured to allow the user to gaze onto the first right eye mirror;
a left visual side port configured to pass the light reflecting or emanating from the object and onto the second left eye mirror; and
a right visual side port configured to pass the light reflecting or emanating from the object and onto the second right eye mirror.

11. The method of claim 10, wherein the apparatus further comprises a cover plate coupled to the vertical surface.

12. The method of claim 9, wherein the apparatus further comprises:
a left eye baffle coupled to the platform, the left eye baffle configured to block stray light from interfering with the user's left eye; and
a right eye baffle coupled to the platform, the right eye baffle configured to block stray light from interfering with the user's right eye.

13. The method of claim 9, wherein the platform comprises a recess configured to accommodate a bridge of the user's nose.

14. The method of claim 9, wherein the first left eye mirror comprises a 2-axis mirror, wherein the second left eye mirror comprises a 2-axis mirror, wherein the first right eye mirror comprises a 2-axis mirror, and wherein the second right eye mirror comprises a 2-axis mirror.

15. The method of claim 9, wherein separation between the second left eye mirror and the second right eye mirror is less than the pupillary distance.

16. The method of claim 9, wherein separation between the second left eye mirror and the second right eye mirror is greater than the pupillary distance.

* * * * *